United States Patent [19]
Woo et al.

[11] 3,883,417
[45] May 13, 1975

[54] TWO-STAGE SYNTHESIS OF LUBRICATING OIL

[75] Inventors: Charles Woo, Sarnia, Ontario, Canada; John A. Bichard, Baton Rouge, La.

[73] Assignee: Exxon Research and Engineering Company, Linden, N.J.

[22] Filed: Dec. 5, 1973

[21] Appl. No.: 422,096

[52] U.S. Cl. ................... 208/49; 208/18; 208/71; 260/683.1
[51] Int. Cl. ............................................. C10g 37/08
[58] Field of Search ........ 208/49, 71, 18; 260/683.1

[56] References Cited
UNITED STATES PATENTS
2,111,831  3/1938  Batchelder et al. ............... 260/683.1
2,773,106  12/1956  Hamner .......................... 260/683.1
3,676,521  7/1972  Stearns et al. ................... 260/683.1

OTHER PUBLICATIONS
Seger et al., I & EC Vol. 42, No. 12, pages 2246 to 2252 (1950).

*Primary Examiner*—Herbert Levine
*Attorney, Agent, or Firm*—Byron O. Dimmick

[57] ABSTRACT

A synthetic lubricating oil of high viscosity index is obtained by a two-stage thermal polymerization process wherein the feedstock for the polymerization comprises a mixture of linear alpha-olefins that can be obtained from the steam cracking of a paraffin wax, a petroleum gas oil or a solvent extracted petroleum distillate. The more reactive impurities such as diolefins and triolefins are removed in the first polymerization stage, thereby ensuring the absence of relatively low V.I. components in the product of the second stage.

6 Claims, No Drawings

TWO-STAGE SYNTHESIS OF LUBRICATING OIL

BACKGROUND OF THE INVENTION

The present invention concerns an improvement in the art of preparing synthetic hydrocarbon lubricating oils by the thermal polymerization of linear alpha-olefins. More particularly it concerns a thermal polymerization process that enables the use of relatively impure olefin feedstocks.

The preparation of lubricating oils by the thermal polymerization of alpha-olefins in the absence of catalysts is well known in the art. For example, the thermal polymerization of olefins ranging from about 6 to about 16 carbon atoms is described in U.S. Pat. No. 2,500,166 and in an article by F. M. Seger, et al. in *Industrial And Engineering Chemistry*, Volume 42, pages 2446–2452 (1950). Olefin feedstocks for such polymerization processes are ordinarily obtained by the cracking of paraffin wax or other petroleum fractions. Usually the cracking operation is a thermal reaction that has been controlled by the presence of steam. Other olefin sources include products of the Fisher-Tropsch process.

A serious drawback to the commercial production of high viscosity index synthetic lubrication oils by the thermal polymerization of linear alpha-olefins has been the high cost of the olefin feedstock, as it has ordinarily been necessary to purify the olefin stream before subjecting it to polymerization, because it will normally contain, in addition to the alpha-olefins, such materials as other olefins and other hydrogen-deficient compounds as well as paraffins, naphthenes, aromatics etc. The present invention enables the use of widely available relatively low cost refinery streams obtained by the steam cracking of petroleum waxes, petroleum oil raffinates or gas oils.

DESCRIPTION OF THE INVENTION

The present invention relates to a process wherein high viscosity index lubricating oils are prepared from mono alpha-olefin feeds containing undesirable reactive impurities including diolefins and triolefins. This is accomplished by a two-stage thermal process wherein the undesirable reactive impurities are removed in the first stage, thereby ensuring the absence of relatively low viscosity index components in the product of the second stage.

Although the mono-olefin feeds can be obtained from any suitable source a very desirable source is the product obtained from the steam cracking of a petroleum hydrocarbon fraction which is preferably a paraffin wax, a petroleum gas oil, or a raffinate obtained by the solvent refining of a lubricating oil distillate or of a gas oil fraction. The gas oil fraction can be obtained from any suitable crude oil source and will include fractions boiling within the range of about 500° to about 1200°F. at atmospheric pressure.

The solvent refining of petroleum distillates such as gas oils and lubricating oil distillates with such solvents as phenol, cresol, aniline, sulfur dioxide, furfural and the like is well known in the art and generally serves to reduce the aromatic hydrocarbon content of the distillate being treated. The advantage gained when using a solvent raffinate in the present invention is that the higher paraffinicity of the starting material results in higher quality in the final product.

The paraffin wax, gas oil or solvent refined petroleum distillate is subjected to a steam cracking operation wherein the hydrocarbon vapors of the hydrocarbon feedstock are mixed with a sufficiently high proportion of steam to form a cracking feed mixture containing about 10 to 500 mole percent, preferably about 60 to 90 mole percent steam, the cracking being conducted at a temperature within the range of about 900° to about 1400°F. or more usually between about 1000° and 1200°F. with a residence time of generally between about 0.1 and 30 seconds, preferably between about 0.5 and 5 seconds. The cracking pressure will generally be in the range of about 1 to 3 atmospheres. For the purposes of the present invention, the reaction conditions in the steam cracking are adjusted for a conversion of the feed hydrocarbons to $C_1$–$C_{20}$ olefins of about 5 to 50 wt. percent per pass, more preferably about 5 to 35 wt. percent per pass.

The resulting steam cracked hydrocarbon fraction is subjected to a fractional distillation in order to obtain a cut containing olefins having in the range of from 5 to 20 carbon atoms. The cut can contain the full spread of $C_5$ to $C_{20}$ olefins or it can be a narrower cut within that range, say $C_5$ to $C_9$, $C_6$ to $C_{18}$, etc. In general the lower the average carbon number in the $C_5$ to $C_{20}$ range the lower the pour point and the lower the viscosity index of the lubricating oil product. A cut of olefins of from 8 to 14 carbon atoms is considered an optimum feed that gives a fairly acceptable viscosity index coupled with a low pour point and thus for this reason will often be preferred.

In conducting the two-stage process of the present invention the selected olefin cut is subjected to an initial stage of thermal polymerization at a temperature in the range of about 300°–650°F., preferably 500°–600°F. for from 0.1 to 10, preferably 1 to 3 hours, wherein polymerization of the more reactive components, including diolefins, and triolefins occurs. The pressure can range from atmospheric to 1000 psig. The product of this first stage is distilled to 600°–650°F. overhead cut-off to obtain as a distillate a "purified" olefin feed which is then subjected to a second stage of thermal polymerization at 600°–800°F. for from about 0.1 to about 20 hours, preferably from about 1 to 10 hours at 0 to 1000 psig. The bottoms from the distillation of the first stage product can be recycled to the steam cracking stage. The product of the second stage of polymerization is also subjected to a distillation step to remove overhead all fractions that boil up to 650°F. at atmospheric pressure, these being principally unreacted olefins, which are recycled to the second polymerization stage. If it is determined that there is a tendency for build-up of undesired materials in the system by use of the recycle, lending to reduced quality in the product, a portion of the recycle stream, say 10 to 20 percent, can be bled from that stream on a continuous basis.

The bottoms from the fractionation of the second stage product, comprising the desired polymeric material are preferably subjected to a conventional hydrofinishing treatment, which will remove unsaturation. Conventional hydrofinishing conditions can be used, employing conventional catalysts such as nickel, cobalt molybdate, etc. The polymeric product can also be subjected to a conventional dewaxing operation if it is desired to lower its pour point.

The invention is illustrated by the following examples, which include preferred embodiments.

EXAMPLE 1

A gas oil obtained from an Arabian crude oil and having a boiling range, corrected to 760 mm atmospheric pressure, of about 570° to 1040°F. and an aromatics content of 44.2 wt. percent was phenol extracted to give a raffinate having an aromatic content of 23.3 wt. percent and a corrected boiling range of about 530° to 975°F. The raffinate was steam cracked at 1100°F. and 7.2 psig pressure at a residence time of 0.62 second giving a conversion of 38 percent to $C_1$–$C_{20}$ olefins. The cracked product was fractionated and the $C_5$–$C_{20}$ cut was subjected to thermal polymerization in a one-stage process at 650°F. for 10 hours. The initial pressure in the reactor was about 200 psig which increased to about 400 psig when the 650°F. temperature was reached. The resulting product, after removing unreacted material boiling up to 650°F., was then subjected to hydrogenation at 500°F. and 800 psig of hydrogen using a nickel catalyst at a rate of 1 volume of feed per volume of catalyst per hour. After solvent dewaxing the hydrogenated product to a pour point of 0°F. the product had a viscosity index of 96.

An additional portion of the $C_5$–$C_{20}$ cut from the above steam cracking operation was subjected to a first stage of polymerization at 600°F. at 200 to 400 psig for 2 hours. The product of the first stage was subjected to a fractionation to separate a $C_5$–$C_{20}$ cut which was then subjected to a second polymerization at 650°F. and 200 to 400 psig for 10 hours. The polymeric material obtained in the first polymerization stage after removal of the $C_5$–$C_{20}$ cut was examined and found to have a viscosity index of 56. The product of the second polymerization was hydrofinished and dewaxed in the same manner as for the one-stage product described above and gave a lube oil product having a viscosity index of 108.

COMPARATIVE EXAMPLE

The two-stage polymerization described in Example 1 was repeated using as the polymerization feedstock the $C_5$–$C_{20}$ cut obtained from the steam cracking of the same raffinate used in Example 1 with the exception that the cracking operation was conducted under conditions giving a conversion of hydrocarbons to $C_1$–$C_{20}$ olefins of 77 wt. percent per pass. The polymerization product was hydrofinished and dewaxed in the same manner as in Example 1. The viscosity index of the finished lubricant from the second stage polymerization in this case was only 86.

EXAMPLE 2

The two-stage polymerization described in Example 1 was repeated under the conditions therein described, using mixed olefin feeds derived from the mild steam cracking of wax and of a gas oil derived from an Arabian crude oil. Here again a comparison was made between a one-stage process and a two-stage process. The gas oil was the one used as the source of the raffinate employed in Example 1, and the wax was derived from that raffinate by conventional dewaxing. The steam cracking conditions used to prepare olefins from the gas oil were the same as described in Example 1, with a conversion of 37 percent to $C_1$–$C_{20}$ olefins, while those for cracking the wax were 1065°F., 15 psig pressure, 1 second residence time and 35 percent conversion to $C_1$–$C_{20}$ olefins. The inspections of the feeds to the steam cracker in each case are given in the following Table I and the characteristics of the products obtained in the one-stage process and in the two-stage process are given in the following Table II. Corresponding data for the raffinate runs of Example 1 are also included.

TABLE I

INSPECTIONS ON ARABIAN FEEDSTOCKS

| | Gas Oil | Raffinate | Wax |
|---|---|---|---|
| Gas Chromatography Distillation % Corrected to 760 mm | | | |
| IBP | 569 | 531 | 471 |
| 5 | 716 | 664 | 664 |
| 20 | 773 | 730 | 724 |
| 40 | 809 | 773 | 767 |
| 60 | 841 | 807 | 801 |
| 80 | 873 | 841 | 837 |
| 95 | 915 | 871 | 923 |
| FBP | 1037 | 974 | 1050 |
| Oil Content, wt.% | — | — | 32.5 |
| Wax Content, wt. % | — | 15.6 | — |
| Melting Point, °F. | — | 80 | 114 |
| Gravity at 60°F., °API | 23.7 | 32.3 | 38.9 |
| V.I. of Dewaxed Oil | 64 | 105 | |
| Viscosity of Dewaxed Oil SUS at 210°F. | 47 | 44 | |
| Silica Gel Analysis, wt. % | | | |
| Aromatics | 44.2 | 23.3 | 9.2 |
| Saturates | 50.5 | 73.7 | 89.6 |
| Polars | 4.8 | 0.2 | 1.4 |

TABLE II

ONE STAGE AND TWO STAGE THERMAL POLYMERIZATION OF ALPHA OLEFINS

| | Feedstock | | |
|---|---|---|---|
| | Gas Oil | Raffinate | Wax |
| One Stage Polymerization of $C_5$–$C_{20}$ Cracked Product | | | |
| $VI_{(e)}$ of 650°F+ oil | 89 | 96 | 130 |
| SUS/210°F. " | 46.9 | 48.3 | 48.3 |
| Two Stage Polymerization of $C_5$–$C_{20}$ Cracked Product | | | |
| $VI_{(e)}$ of 650°F+ oil from first stage | 62 | 56 | 115 |
| SUS/210°F of 650°F+ oil from first stage | 41.8 | 46.2 | 48.7 |
| $VI_{(e)}$ of 650°F+ oil from second stage | 100 | 108 | 146 |
| SUS/210°F of 650°F+ oil from second stage | 46.4 | 46.3 | 43.5 |
| Yields of 2nd Stage Product on Steam Cracker Feed, wt. % (Estimated) | 11 | 21 | 31 |

The designation $VI_{(e)}$ in Table II refers to extended viscosity index for viscosity indexes higher than 100. See ASTM D-2270.

It is clear from the data in Table II that in the two-stage process the viscosity index of the lubricating oil from the second stage is substantially higher than that obtained in the one-stage process. It can be seen from the inspections of the bottoms from the first stage polymerization and the two-stage process that undesirable relatively low viscosity index materials are removed in the first stage of the two-stage process, since these products have lower viscosity indexes than the oils obtained in the single stage process.

It is to be understood that there is no intention to limit the scope of this invention to the specific examples presented by way of illustration. The scope of the invention is defined by the claims appended hereto.

What is claimed is:

1. A process for preparing a synthetic lubricating oil of high viscosity index which includes the following steps:
    a. subjecting a hydrocarbon mixture comprising alpha olefins within the range of 5-carbon-atom to 20-carbon-atom olefins to a thermal polymerization at a temperature within the range of about 300° to 650°F. for from 0.1 to 10 hours in a first zone;
    b. separating from the product of the thermal polymerization a fraction comprising unreacted olefins having from 5 to 20 carbon atoms;
    c. subjecting the last named olefin fraction to further thermal polymerization in a second zone at a temperature within the range of about 600° to 800°F. for from 0.1 to 20 hours; and
    d. recovering a synthetic lubricating oil product from said second zone.

2. A process as defined by claim 1 wherein said alpha olefin mixture is a mixture of $C_8$ and $C_{14}$ alpha olefins.

3. A process as defined by claim 1 which includes the further steps of subjecting the product of the second zone to hydrofinishing and dewaxing treatment.

4. A process for preparing a synthetic lubricating oil of high viscosity index which includes the following steps:
    a. subjecting a petroleum hydrocarbon fraction selected from the class consisting of paraffin waxes, gas oils, gas oil raffinates and lubricating oil raffinates, to a steam cracking operation at a temperature within the range of about 900° to 1500°F. under conditions causing conversion to $C_1$–$C_{20}$ olefins within the range of 5 to 50 wt. percent per pass;
    b. separating from the product of the steam cracking operation a fraction comprising hydrocarbons having in the range of 5 to 20 carbon atoms;
    c. subjecting the last named fraction to a thermal polymerization at a temperature within the range of about 300° to 650°F. for from 0.1 to 10 hours in a first zone;
    d. separating from the product of the thermal polymerization a fraction comprising hydrocarbons of from 5 to 20 carbon atoms;
    e. subjecting the last named fraction to further thermal polymerization in a second zone at a temperature within the range of from about 600° to 800°F. for from 0.1 to 20 hours; and
    f. recovering a synthetic lubricating oil product from said second zone.

5. A process as defined by claim 4 which includes the further steps of subjecting the product of the second polymerization to hydrofinishing and dewaxing.

6. A process as defined by claim 4 wherein the steam cracking operation is conducted to give a conversion to $C_1$–$C_{20}$ olefins of from about 5 to about 35 wt. percent per pass.

* * * * *